United States Patent
Harshbarger et al.

(10) Patent No.: US 8,091,414 B2
(45) Date of Patent: Jan. 10, 2012

(54) METHODS OF DETECTING REPLACEMENT OF A PARTICULATE MATTER FILTER

(75) Inventors: Daniel R. Harshbarger, Columbus, IN (US); Daniel D. Wilhelm, Nashville, IN (US); Purna Chander Nalla, Hyderabad (IN)

(73) Assignee: Cummins Filtration IP, Inc., Minneapolis, MN (US)

( * ) Notice: Subject to any disclaimer, the term of this patent is extended or adjusted under 35 U.S.C. 154(b) by 547 days.

(21) Appl. No.: 12/191,586

(22) Filed: Aug. 14, 2008

(65) Prior Publication Data

US 2010/0037684 A1 Feb. 18, 2010

(51) Int. Cl.
*G01M 15/10* (2006.01)
(52) U.S. Cl. .................. 73/114.69; 73/114.76
(58) Field of Classification Search ............... 73/114.69, 73/114.74, 114.75, 114.76
See application file for complete search history.

(56) References Cited

U.S. PATENT DOCUMENTS

| | | | |
|---|---|---|---|
| 7,797,926 B2 * | 9/2010 | Nishino et al. ............. | 60/277 |
| 2004/0206069 A1 | 10/2004 | Tumati et al. | |
| 2005/0247051 A1 | 11/2005 | Wagner et al. | |
| 2007/0044455 A1 | 3/2007 | Barasa et al. | |
| 2008/0104947 A1 | 5/2008 | Wang et al. | |
| 2009/0217762 A1 * | 9/2009 | Bardon et al. ............. | 73/597 |

OTHER PUBLICATIONS

U.S. Appl. No. 12/138,493, filed Jun. 13, 2008.
International Search Report from corresponding International Application No. PCT/US2009/053107 mailed Mar. 4, 2010, 3 pages.
Written Opinion of the International Searching Authority from corresponding International Application No. PCT/US2009/053107 mailed Mar. 4, 2010, 4 pages.

* cited by examiner

*Primary Examiner* — Eric S McCall
(74) *Attorney, Agent, or Firm* — Hamre, Schumann, Mueller & Larson, P.C.

(57) ABSTRACT

Methods of monitoring replacement of a diesel particulate filter (DPF) by a non-particulate matter filter. The disclosed methods takes into account a change in delta pressure based soot load estimates (DPSLE) over time to detect whether the DPF has been replaced. The estimate, which is measured by the delta pressure drop across the filter, can be used to determine whether a device that does not have the capability of trapping soot, such as a muffler, has been inserted.

12 Claims, 3 Drawing Sheets

US 8,091,414 B2

METHODS OF DETECTING REPLACEMENT OF A PARTICULATE MATTER FILTER

FIELD

This disclosure relates generally to methods for monitoring a device, and more particularly to methods of monitoring for replacement of a particulate matter filter used for diesel engine exhaust aftertreatment.

BACKGROUND

Aftertreatment devices are well known and widely used in various internal combustion engine applications for the aftertreatment of engine exhaust gases. Such devices as diesel oxidation catalysts (DOC) and diesel particulate filters (DPF) have been useful for handling and/or removing harmful constituents, including carbon monoxide, nitric oxide, unburned hydrocarbons, and soot in the exhaust stream of an engine.

As the DPF collects particulate matter such as soot from the exhaust gas, a back pressure will increase. In order to remove the soot in the DPF, the DPF is often times regenerated by converting the trapped soot to carbon dioxide in the presence of heat.

In certain countries, environmental laws require aftertreatment devices such as DPFs to be monitored.

SUMMARY

Methods of detecting replacement of a particulate matter filter, and in particular, replacement of a DPF with a non-particulate matter filter are described. While the methods described herein have particular use in detection of a DPF replacement with a muffler in an exhaust gas aftertreatment system, the methods can be employed in other filter technologies where one wishes to detect the replacement of a particulate matter filter by a non-particulate matter filter device.

The disclosed methods takes into account a change in delta pressure based soot load estimates (DPSLE) over time to detect whether the system contains a DPF or another device. The estimate, which is based on the measured pressure drop across the filter, can be used to determine whether a device that does not have the capability of trapping soot, i.e., a non-particulate matter filter device, has been inserted in place of the DPF.

In one embodiment, the method involves detecting whether a DPF has been replaced with a muffler. The method includes calculating the change in measured pressure drop across the DPF. In one implementation, the change in measured pressure drop is calculated during active regeneration. The calculated change in measured pressure drop across the DPF is then compared with a predetermined threshold. If the calculated change is below the predetermined threshold before the end of active regeneration, then a fault signal is generated, indicating the presence of a muffler.

DETAILED DESCRIPTION

Methods of monitoring for replacement of an aftertreatment device are described. The disclosed methods detect whether an aftertreatment device has been replaced within an exhaust gas aftertreatment system. The following description will describe the aftertreatment device as being a particulate matter filter, and a material to be filtered as exhaust gas. However, in appropriate circumstances, the concepts described herein can be applied to other types of filters and filtration systems where detection of replacement of particulate matter filters is desired.

The disclosed method generally involves measuring a parameter based on delta pressure measurements across a particulate matter filter, where delta pressure is the difference between the pressure at the inlet of the filter and the pressure at the outlet of the filter. The measured parameter is not particularly limited, and can be pressure drop, temperature, soot load in the aftertreatment device, exhaust gas constituents for example $CO_2$, etc.

One suitable means of measuring the parameter based on delta pressure measurements across a particulate matter filter is described in U.S. application Ser. No. 12/138,493, titled "METHODS OF INCREASING ACCURACY OF SOOT LOAD ESTIMATES", and is hereby incorporated by reference.

The disclosed method further involves calculating the change in parameter values to determine whether the particulate matter filter has been replaced with a non-particulate matter filter. The non-particulate matter filter may be any device that does not have the capability of trapping particulate matter, such as a muffler, etc.

In addition, the period in which the change in parameter values is calculated is not particularly limited, and may be during a particulate matter removal stage, the particulate matter filling stage between the end of the last removal stage and the start of the next removal stage, etc.

Figure 1:
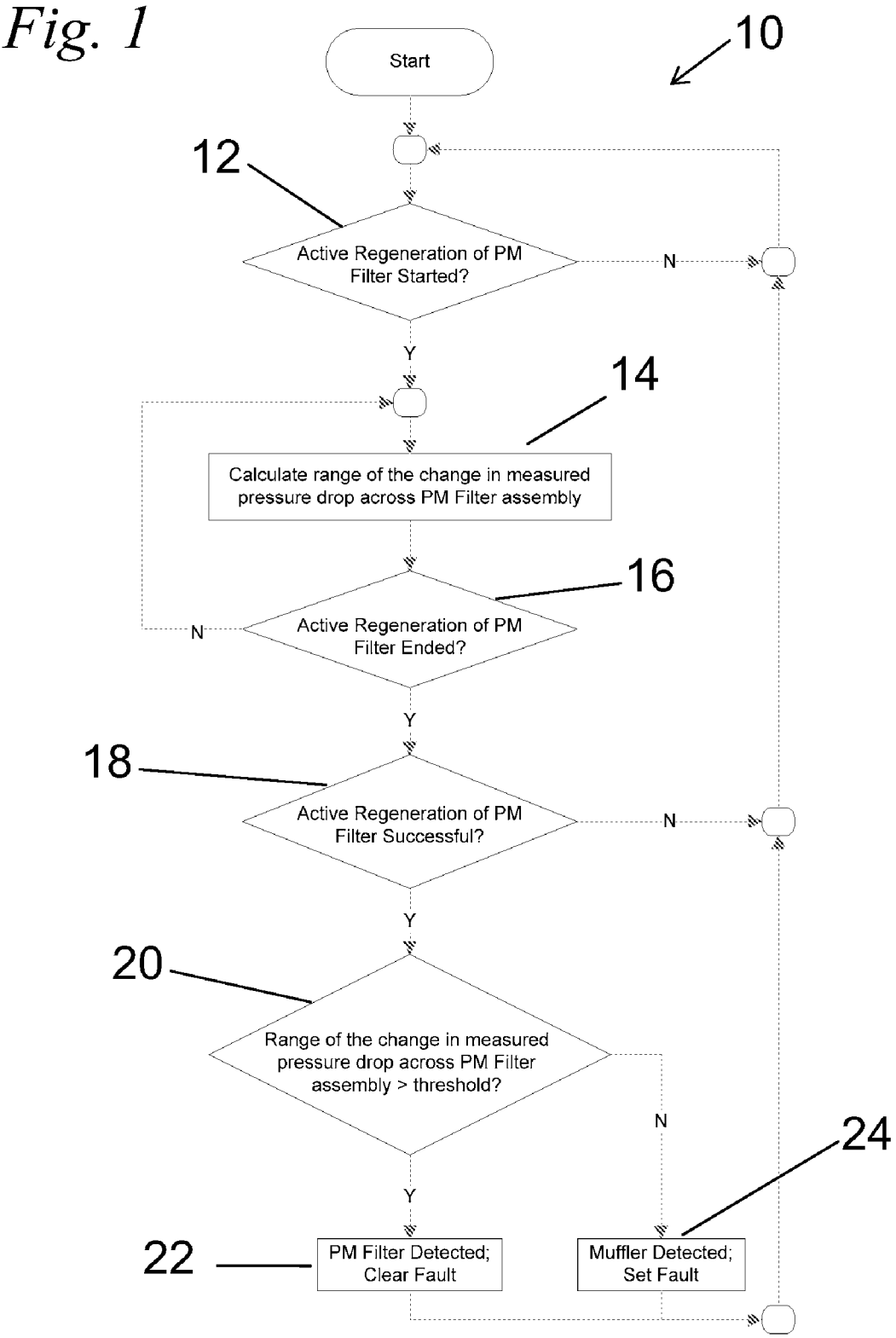
FIG. 1 is a flow diagram of one embodiment of the disclosed method.

FIG. 1 shows one embodiment of the disclosed method. The method 10 includes determining whether active regeneration of a particulate matter filter has started 12. Once the active regeneration has started, the range of the change in measured pressure drop across the particulate matter filter is calculated 14.

Then, a determination is made as to whether the active regeneration of the particulate matter filter has ended 16. If the active regeneration has not ended, then the range of the change in measured pressure drop across the particulate matter filter is calculated 14 until the active regeneration has ended.

Once the active regeneration has ended, a determination is made as to whether the active regeneration of the particulate matter filter was successful 18. If the active regeneration is determined to be successful, then the range of the change in measured pressure drop across the particulate matter filter is compared with a predefined threshold 20. If the range is less than or equal to the predefined threshold, then a fault is triggered, indicating the presence of a muffler 24. If the range is above the predefined threshold, then the fault is cleared, indicating the presence of the particulate matter filter 22.

If the active regeneration is determined to be not successful in step 18, then a determination is made as to whether a subsequent active regeneration of a particulate matter filter has started 12, and the steps 14, 16 and 18 are repeated.

FIG. 1 describes in step 24 that the fault is triggered in the presence of the muffler. However, in appropriate circumstances, the concepts can be applied to detecting replacement of particulate matter filter by other non-particulate matter filter devices, so long as the non-particulate matter filter device is not capable of trapping particulate matter.

Figure 2:
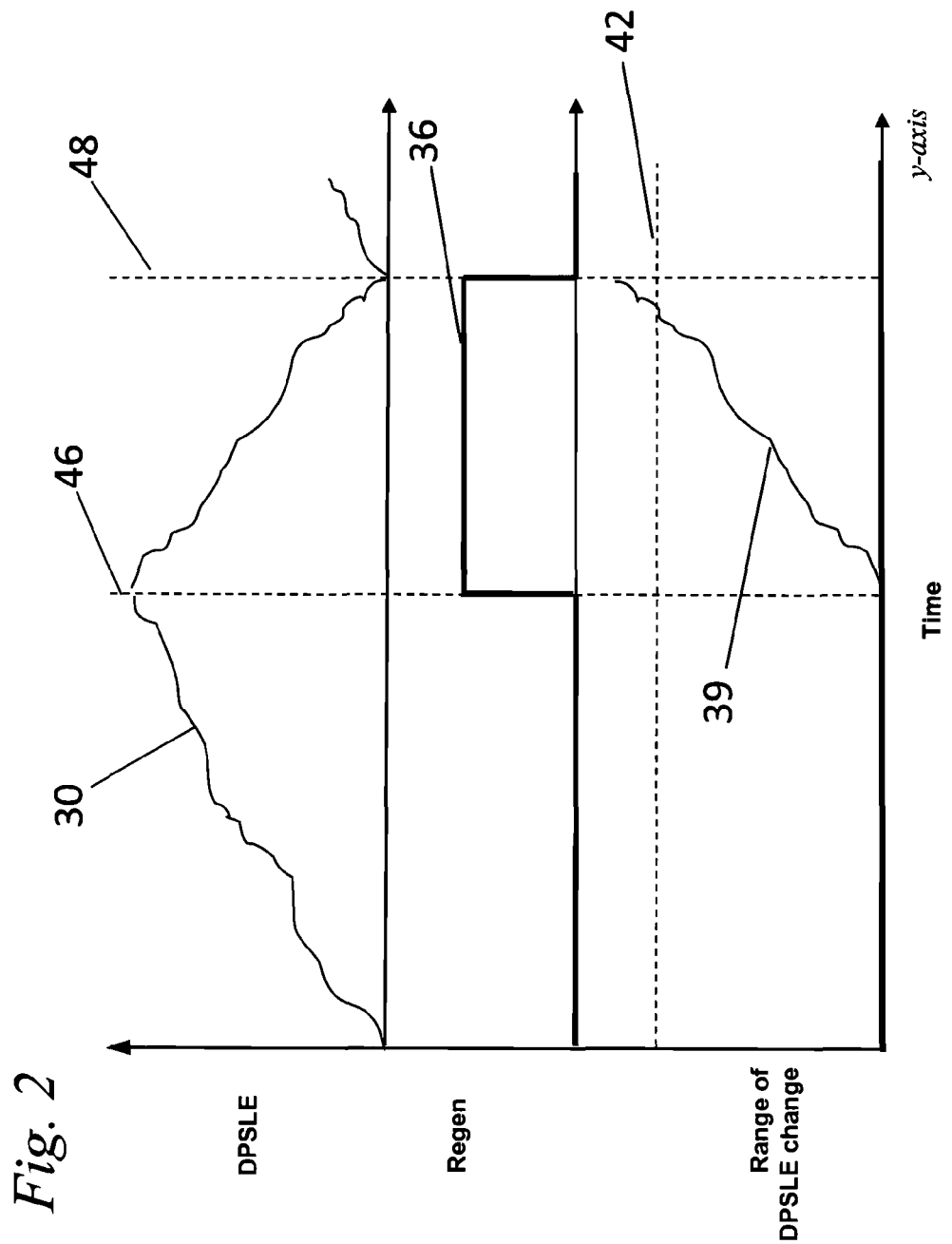
FIG. 2 shows an exemplary representation of values that can be obtained when a DPF is present.
Figure 3:
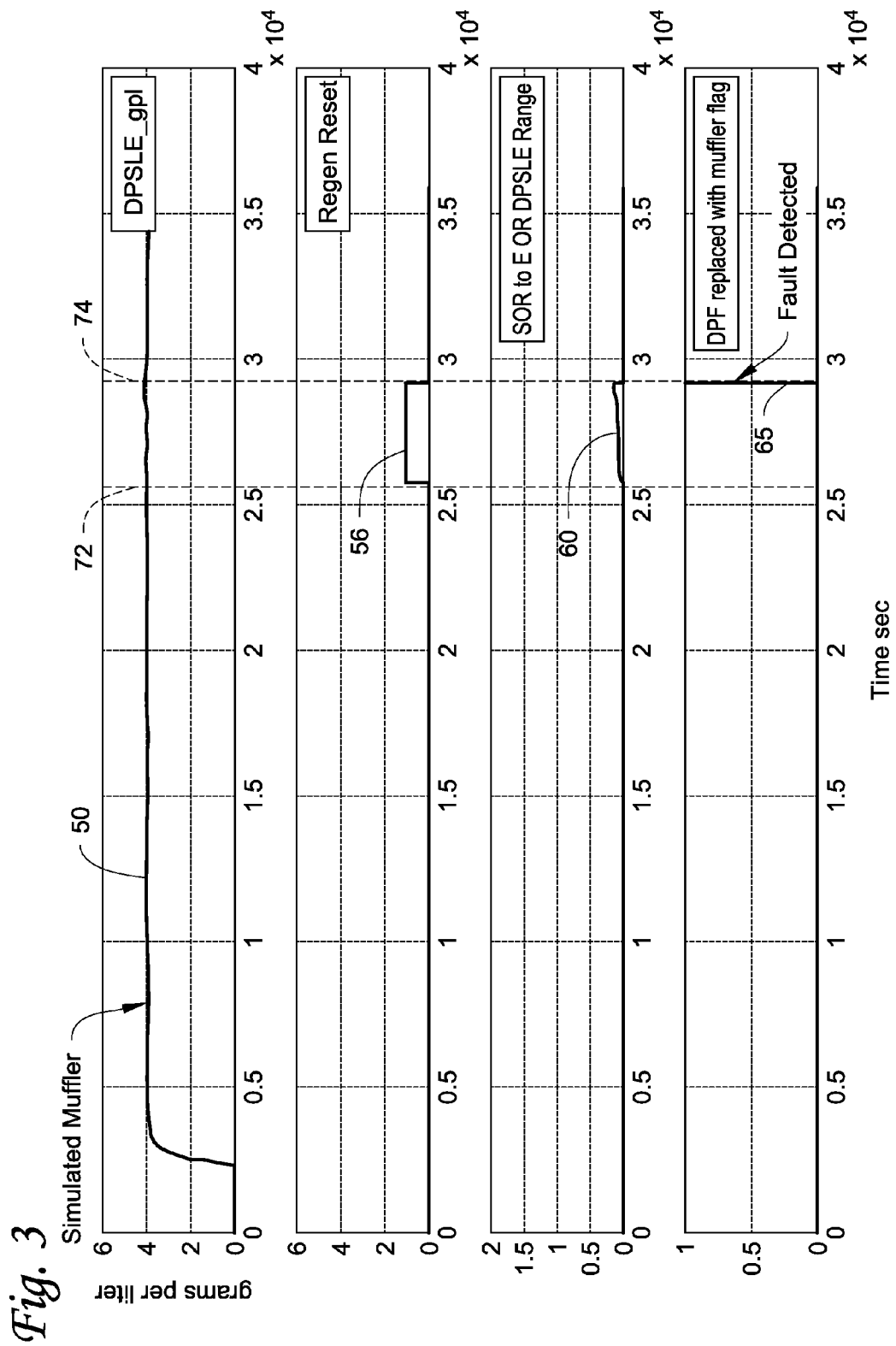
FIG. 3 shows an exemplary representation of values that can be obtained when a DPF is replaced with a muffler.

One implementation of the method 10 using a DPF as the particulate matter filter is described with reference to FIGS. 2 and 3. FIGS. 2 and 3 are exemplary representation of values that are obtained from the method 10 over time, the time being represented by the y-axis.

In particular, FIG. 2 shows exemplary representation of values where a DPF is present. FIG. 2 shows: (1) plotted values 30 of DPSLE measurements, where in this portion of the graph, the vertical axis represents the DPSLE, (2) a regeneration trigger 36, where in this portion of the graph, a positive value on the vertical axis indicates active regeneration and a zero value on the vertical axis represents active regeneration is not occurring and (3) plotted values 39 of calculated differences in DPSLE from the start of the regeneration and the respective points during the regeneration period, where in this portion of the graph, the vertical axis represents the calculated changes in DPSLE. Vertical dotted lines 46 and 48 indicate reference positions on the y-axis as to a starting time of active regeneration and an ending time of active regeneration, respectively.

FIG. 3 shows exemplary representation of values where a DPF is replaced with a muffler. FIG. 3 shows: (1) plotted values 50 of DPSLE measurements, where in this portion of the graph, the vertical axis represents the DPSLE, (2) a regeneration trigger 56, where in this portion of the graph, a positive value on the vertical axis indicates active regeneration and a zero value on the vertical axis represents active regeneration is not occurring, (3) plotted values 60 of calculated differences in DPSLE from the start of the regeneration period and the respective points during the regeneration period, where in this portion of the graph, the vertical axis represents the calculated changes in DPSLE, and (4) a trigger signal 65, where in this portion of the graph, a positive value on the vertical axis indicates detection of a fault. Vertical dotted lines 72 and 74 indicate reference positions on the y-axis as to a starting time of active regeneration and an ending time of active regeneration, respectively.

When the DPF is present, the DPF collects soot from the exhaust before the starting time of active regeneration 46, and the delta pressure will gradually increase as the DPF fills with soot as shown by the upward portion of the plotted values 30 in FIG. 2. Once the regeneration is triggered at the starting time of active regeneration 46, the DPSLE decreases rapidly as shown by the downward portion of the plotted values 30. This rapid decrease in DPSLE indicates that a significant amount of soot is being oxidized.

The differences in the DPSLE at the starting time 46 and at respective points during the regeneration period are depicted in the plotted values 39. The plotted values 39 cross above a threshold 42 before the end of regeneration 48, and thus is an example where the presence of DPF is detected.

Where the DPF is replaced with a muffler, which does not have the capability of trapping soot, the delta pressure drop across the muffler is based on the physical properties of the muffler rather than soot accumulation. Thus, as shown by the plotted values 50, the DPSLE does not vary, even after regeneration. Accordingly, the differences in the DPSLE at the starting time 72 and at respective points during the regeneration period as shown in the plotted values 60, does not change drastically as compared to where the DPF is present. As a result, the plotted values 50 stays below a predefined threshold (not shown) and the fault signal 65 is triggered at the end of the regeneration period 74.

In one example, the calculated difference in the DPSLE at the starting time and at respective points during the regeneration period will be greater than noise that is inherent in the sensing systems and in the soot load estimates so that a valid decision can be made as to whether the system contains a DPF or a muffler.

While the disclosed methods have been described in conjunction with a preferred embodiment, it will be obvious to one skilled in the art that other objects and refinements of the disclosed methods may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:

1. A method of detecting replacement of a particulate matter filter by a non-particulate matter filter, comprising:
   monitoring a change in pressure drop over a time period across a region expected to contain the particulate matter filter;
   comparing the monitored change in pressure drop against a change in pressure drop that would be expected if the particulate matter filter is present in the region; and
   determining if the particulate matter filter has been replaced with the non-particulate matter filter based on the following criteria:
   (1) the particulate matter filter has been replaced with the non-particulate matter filter if the monitored change in pressure drop does not meet or exceed the expected change in pressure drop;
   (2) the particulate matter filter has not been replaced with the non-particulate matter filter if the monitored change in pressure drop meets or exceeds the expected change in pressure drop,
   wherein if the particulate matter filter has been determined to be replaced with the non-particulate matter, a fault is logged to indicate the replacement of the particulate matter filter by the non-particulate matter filter.

2. The method of claim 1, wherein the time period is a period of time during a cleaning procedure of the particulate matter filter that is intended to eliminate particulate matter from the particulate matter filter.

3. The method of claim 1, wherein monitoring the change in pressure drop includes defining a start time and a stop time, and computing the difference in pressure drop at the start time and the stop time.

4. The method of claim 1, wherein the particulate matter filter is a diesel particulate filter and the removable particulate matter is soot.

5. A method of detecting replacement of an aftertreatment device used for treating exhaust emissions from a combustion engine by a non-aftertreatment device, comprising:
   monitoring a change in a parameter over a time period across a region expected to contain the aftertreatment device;
   comparing the change in the parameter with a predetermined threshold parameter change that would be expected if the aftertreatment device is present in the region; and
   determining if the aftertreatment device has been replaced with the non-aftertreatment device based on the following criteria:
   (1) the aftertreatment device has been replaced with the non-aftertreatment device if the monitored change in the parameter does not meet or exceed the predetermined threshold parameter change,
   (2) the aftertreatment device has not been replaced with the non-aftertreatment device if the monitored change in the parameter meets or exceeds the predetermined threshold parameter change,
   wherein if the aftertreatment device has been determined to be replaced with the non-aftertreatment device, a fault is logged to indicate the replacement of the aftertreatment device by the non-aftertreatment device.

6. The method of claim 5, wherein the parameter is pressure drop, temperature, soot load in aftertreatment device or exhaust gas constituents.

7. The method of claim 6, wherein the exhaust gas constituents include carbon dioxide.

8. The method of claim 5, wherein the time period is a period of time during a cleaning procedure intended to clean the aftertreatment device.

9. The method of claim 5, wherein logging a fault comprises logging a fault when the monitored change in the parameter is less than the predetermined threshold parameter change.

10. The method of claim 5, wherein combustion engine is a diesel engine, the aftertreatment device is a diesel particulate filter, the exhaust emissions is soot, and the non-aftertreatment device is a non-particulate matter filter.

11. A method of detecting replacement of a particulate matter filter by a non-particulate matter filter, comprising:
   monitoring a change in pressure drop over a time period across a region expected to contain the particulate matter filter;
   comparing the monitored change in pressure drop against a change in pressure drop that would be expected if the particulate matter filter is present in the region; and
   if the monitored change in pressure drop does not meet or exceed the expected change in pressure drop, logging a fault to indicate the replacement of the particulate matter filter by the non-particulate matter filter,
   wherein the time period is a period of time during a cleaning procedure of the particulate matter filter that is intended to eliminate particulate matter from the particulate matter filter.

12. A method of detecting replacement of an aftertreatment device used for treating exhaust emissions from a combustion engine by a non-aftertreatment device, comprising:
   monitoring a change in a parameter over a time period across a region expected to contain the aftertreatment device;
   comparing the change in the parameter with a predetermined threshold parameter change that would be expected if the aftertreatment device is present in the region; and
   logging a fault when the monitored change in the parameter does not meet the predetermined threshold parameter change to indicate the replacement of the aftertreatment device by the non-aftertreatment device,
   wherein the time period is a period of time during a cleaning procedure intended to clean the aftertreatment device.

* * * * *